United States Patent [19]

Fey

[11] Patent Number: 4,509,177
[45] Date of Patent: Apr. 2, 1985

[54] ELECTRIC ARC-FIRED BLAST FURNACE SYSTEM

[75] Inventor: Maurice G. Fey, Plum Borough, Pa.

[73] Assignee: Westinghouse Electric Corp., Pittsburgh, Pa.

[21] Appl. No.: 509,121

[22] Filed: Jun. 29, 1983

[51] Int. Cl.³ .............................................. F27B 1/26
[52] U.S. Cl. ..................................... 373/60; 373/102
[58] Field of Search .......................... 373/102, 60, 104; 219/130.1

[56] References Cited

U.S. PATENT DOCUMENTS

| | | | |
|---|---|---|---|
| 823,561 | 6/1906 | Touceda | 373/102 X |
| 3,663,792 | 5/1972 | Fey. | |
| 4,247,732 | 1/1982 | Fey. | |

FOREIGN PATENT DOCUMENTS 752793 12/1970 Belgium.
756555 3/1971 Belgium.

OTHER PUBLICATIONS

The Making, Shaping and Treating of Steel, 9th ed., 1971, pp. 422–472.
Operation of a Blast Furnace with Superhot Reducing Gases by N. Ponghis et al. presented at AIME Conference in Detroit, MI, on 3/26/79.

Primary Examiner—A. D. Pellinen
Assistant Examiner—Susan Steward
Attorney, Agent, or Firm—John Victor Pezdek

[57] ABSTRACT

This invention relates to an electric-arc fired blast furnace system for the reduction of iron-bearing material utilizing electric-arc heated air containing a reducing gas or carbon-containing fuel allowing for a decrease in the amount of coke normally used in the reduction process. The excess reducing gases exiting the furnace are utilized as a source of power via a system consisting of turbines, compressors and a heat exchanger to drive the electrical generators which are used to provide electricity to the arc heaters. This arrangement forms an essentially closed loop furnace system for metal reduction. Injection of finely-divided coal into the arc-heated air to provide reductants is also employed.

8 Claims, 3 Drawing Figures

ELECTRIC ARC-FIRED BLAST FURNACE SYSTEM

BACKGROUND OF THE INVENTION

1. Field of the Invention

This invention relates to a blast furnace system for the production of iron or ferroalloys utilizing an electric arc heater to superheat a reducing gas or fuel which is injected through the furnace tuyeres into the furnace charge or burden allowing for a reduction in the amount of coke which is normally used in the iron-making process.

2. Description of the Prior Art

The blast furnace is the world's primary apparatus for the reduction of iron-bearing materials, such as iron ore, into pig iron. Blast furnaces represent very old technology and have been the subject of major scale-up efforts over the past 20 years. For this reduction process coke is combusted in the furnace with preheated air to provide heat and a reducing gas for the reduction reaction involving the iron-bearing material.

Existing blast furnace systems employ a refractory lined vertical shaft furnace having gas uptakes attached to the top of the shaft, a gas separator, blast air heating stoves, and injection tuyeres. The upper, middle and lower regions of the shaft are known as the stack, bosh and hearth, respectively. In operation, a mixture of iron-bearing materials, coke and flux, which is known as burden, is introduced at the top of the furnace. This burden slowly descends against an upwardly rising flow of reducing gas. Preheated blast air or wind is introduced into the charge through water-cooled tuyeres combusting the coke to produce carbon monoxide and heat. The carbon monoxide reduces the iron-bearing materials into iron which is then melted by the heat liberated by the combustion of the coke and a portion of the heat contained in the blast air. The melted iron and slag which is produced by the reduction reactions are collected in the hearth from which they are removed via outlets known as iron notches and slag notches, respectively. Excess reducing gas and heat rises upwardly through the stack to cause the preheating and pre-reduction of the burden contained therein. This reducing gas and heat exits the top of the furnace and enters the gas uptakes. At this stage these gases are typically referred to as off-gases. These off-gases are then directed into a gas separator for the removal of substantially all entrained particulate materials. The cleaned off-gases are sent to the blast air heating stoves where they are combusted to heat the blast air which will be injected through the tuyeres. This blast air is heated in the stoves to a temperature of approximately 1000° C. A more detailed account of the construction and operation of conventional blast furnace systems may be found in the handbook entitled *The Making, Shaping and Treating of Steel*, 9th ed. Pittsburgh, United States Steel Corporation, 1971, pp. 422–472.

Operation of conventional blast furnaces requires the use of large amounts of coke per ton of hot metal produced. In the United States a typical blast furnace requires about 1150 pounds of coke per ton of hot metal with this coke being produced from costly high-grade metallurgical coal. Because of the expense and environmental problems associated with the production of coke, it would be advantageous to have a blast furnace which can produce pig iron using a lower amount of coke per ton of hot metal produced.

Work is currently underway to effect a significant reduction of the blast furnace coke rate by the injection of electric arc superheated reducing gas through the blast furnace tuyeres. In a paper entitled "Operation of a Blast Furnace with Superhot Reducing Gases" by N. Ponghis, R. Bidal, and A. Poos, Department of Ironmaking and Reduction Centre de Recherches Metallurgiques, Liege, Belgium, presented at the AIME Conference in Detroit, Mich., on Mar. 26, 1979, a single tuyere experimental blast furnace utilizing tuyere injection of a reducing gas superheated by an electric arc furnace, is described. There the electric arc furnace or plasma furnace was used to produce a superhot reducing gas having a temperature above 2000° C. which was injected directly into the main tuyere allowing for a reduction in the coke rate of up to 75%. The reducing gas was obtained by reforming natural gas with either air or $CO_2$ in the plasma furnace which was located at the nose of the tuyere. Thus, it was shown that a significant reduction in the coke rate of a blast furnace could be obtained by the injection of a reducing gas superheated by an electric arc furnace. Another benefit noted by the authors was that the silicon content of the iron could be easily controlled by varying the temperature of the injected superheated reducing gas. They noted that the response of the silicon to such variations was practically instantaneous thus eliminating the long dead and response times normally found in a conventional blast furnace. In U.S. Pat. No. 4,247,732 issued Jan. 27, 1981 and entitled "Method and Apparatus for Electrically Firing An Iron Blast Furnace" an arc heated mixture of a gas containing carbon monoxide is injected into a vertical shaft furnace for reducing iron ore. This furnace also incorporates the benefit of reduced coke consumption.

While these two furnaces have demonstrated that the coke rate can be substantially reduced by the use of an electric arc heater to superheat a reducing gas, the electricity used to power the electric arc heater was provided from a conventional source of power. Therefore, it would be advantageous if the electricity used by the electric arc furnace could be produced by recouping some of the energy contained in the products of the reduction reactions exhausted from the blast furnace. This would eliminate the expensive requirement of purchasing utility generated electricity for the operation of the electric arc heaters.

SUMMARY OF THE INVENTION

The present invention is a blast furnace system utilizing an electric arc heater to superheat a fluid such as blast air or a reducing gas which is then injected into the blast furnace via the tuyeres allowing for a substantial decrease in the coke rate required for the production of iron. By combusting the gases coming off the top of the furnace, electricity is produced to power the electric arc heaters thus eliminating the need to purchase utility generated power during normal operation of the system.

In one embodiment of the invention a combustion turbine-generator set is used to produce the required electricity. Here the off-gases from the blast furnace are combusted in the turbine driving the output shaft of the turbine which in turn drives the generator to produce the electricity. Prior to their entry into the combustion turbine, the off-gases can be cleaned of entrained particulates in a gas scrubber. A steam turbine-driven compressor can then be used to compress these clean gases prior to their entry into the combustion turbine to increase operating efficiency. The heat released in the combustion turbine is directed into a heat exchanger wherein steam is produced to drive the steam turbine. This arrangement of equipment forms an essentially closed-loop system utilizing the blast furnace off-gases to provide electricity for the electric arc heater.

In another embodiment of the invention injection of coal into the blast air is utilized. There the coal and blast air are superheated by the electric arc heater causing the formation of carbon monoxide, a reducing gas which is used to reduce the iron-bearing materials.

BRIEF DESCRIPTION OF THE DRAWINGS

For a better understanding of the invention reference may be made to the preferred embodiments exemplary of the invention shown in the accompanying drawings wherein.

DESCRIPTION OF THE PREFERRED EMBODIMENTS

Figure 1:
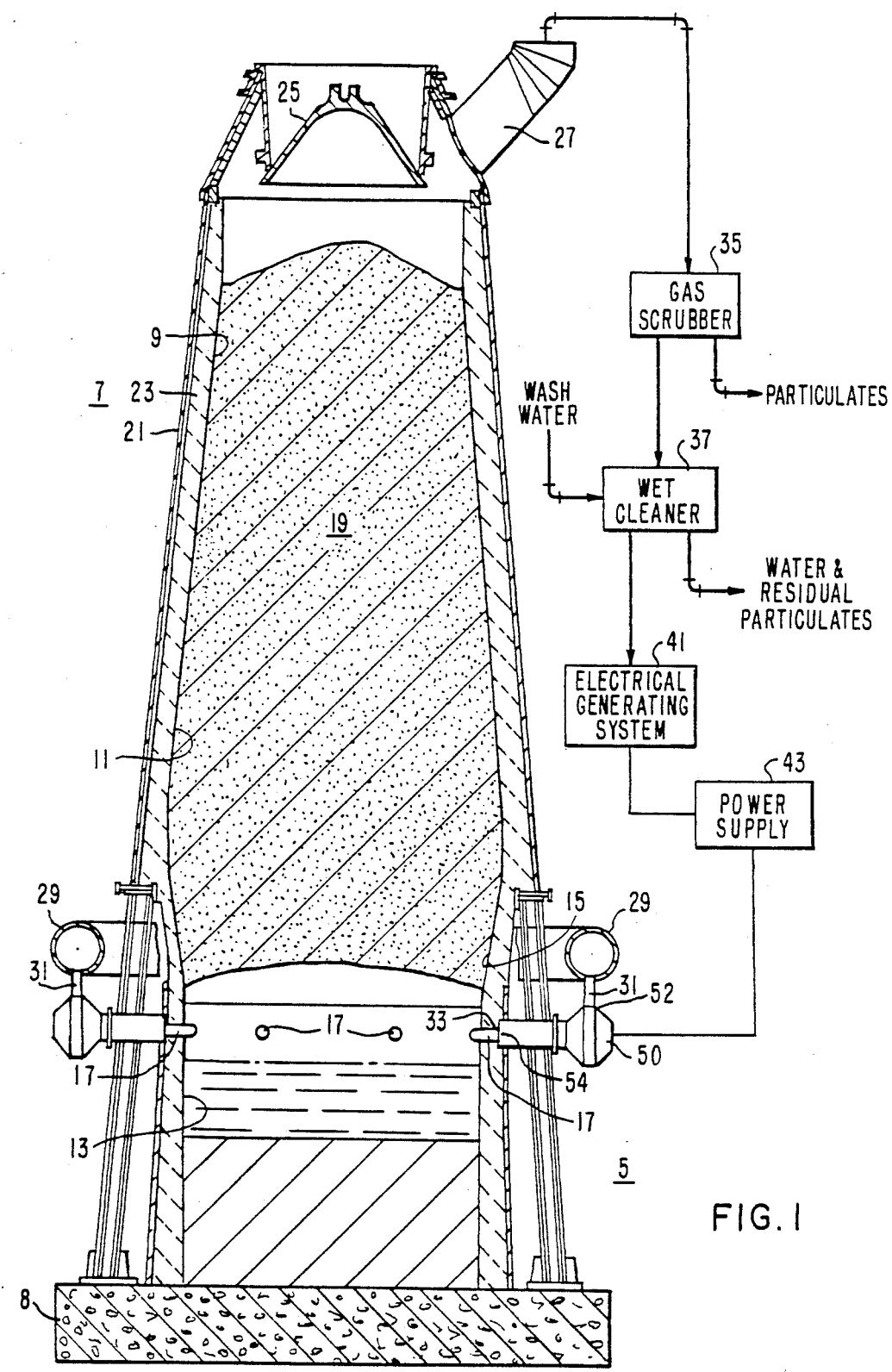
FIG. 1 is a flow diagram of a blast furnace system embodying the present invention.

In FIG. 1 the blast furnace 5 has a refractory shell 7 defining a vertical shaft, the upper, middle and lower regions thereof being known as the stack 9, bosh 11 and hearth 13, respectively with a shell 7 being supported by the base 8. A tuyere 17 disposed about the lower end of the bosh 11 is used to introduce a reducing gas into the burden 19 contained in the shaft. The refractory shell 7 includes an outer wall 21 and a refractory lining 23 with the upper portion of the shell 7 being tapered inwardly and upwardly and being closed at the upper end by a bell-shaped cover 25 through which the burden 19 is dumped into the furnace 5. Excess reducing gas containing entrained particulates and water vapor exits from the top of the furnace through a gas uptake 27 from where it is conveyed to the electrical generating means explained hereinafter. The burden 19 or charge consists primarily of a metal ore, a fuel, and flux, examples of which are iron ore, coke and limestone, respectively. These materials descend countercurrent to the gases rising in the furnace until they reach the bosh 11 which is the region of highest temperature. Maximum reduction of the ore to elemental metal occurs in the bosh 11 with the metal draining to the hearth 13 from where it is tapped or removed from time to time. Slag which is produced by the reduction reaction also drains into the hearth 13 and floats on the top of the molten metal.

While a blast furnace may be operated with a single tuyere, normally a plurality of tuyeres as shown in FIG. 1 are disposed about the lower portion of the bosh 11. A conduit or bustle pipe 29 is connected to each tuyere 17 forming a plenum or header for the delivery of gas to the tuyeres 17 for injection into the furnace 5.

In accordance with the invention an electric arc heater, generally indicated at 50, is provided intermediate each tuyere 17 and the bustle pipe 29. The inlet 52 of the electric arc heater 50 is in communication with the bustle pipe 29 via a conduit 31 with the outlet 54 being in communication with the tail end 33 of the tuyere 17.

The electric arc heater 50 has at least one electrode and an arcing chamber, the electrode adapted to be connected to a source of electrical potential to produce an electric arc in the arcing chamber. Where two or more electrodes are provided these are typically cylindrical in shape with an annular cross-section. There the electrodes are axially spaced from one another to form an annular gap wherein the electric arc is generated. The electric arc heater 50 is either a self-stabilizing DC or single phase AC device capable of power levels to about 5000 kilowatts. Because the electric arc heater 50 is similar in construction and operation to the electric arc heater disclosed in U.S. Pat. No. 3,663,792, "Apparatus and Method of Increasing Arc Voltage and Gas Enthalpy in a Self-Stabilizing Arc Heater", issued May 16, 1972, and U.S. Pat. No. 4,247,732, "Method and Apparatus for Electrically Firing an Iron Blast Furnace", issued Jan. 27, 1982, both patents being assigned to the assignee of the present invention and due to the full disclosure in those patents the description of the arc heater 50 is limited herein to the basic structure and operation.

During furnace operation, a gaseous mixture of a carbon fuel and an oxygen containing gas is introduced into the bustle pipe 29 and enters through the inlet 52 of the electric arc heater for heating by the electric arc in the arcing chamber. This heating forms a superheated gas stream containing a reducing gas, such as carbon monoxide, having a temperature in the range of about 2000° C. to about 2500° C. The arc heated gas stream exits the outlet 54 of the electric arc heater 50 and is injected into the bosh 11 via the tuyere 17 where it contacts the burden 19 in the furnace. The arc heated gas stream reacts with the burden 19 to produce metal and slag with the metal and slag being collected in the hearth 13. The gases pass upwardly through the burden 19 entraining particulates and cause the prereduction and preheating of the burden 19 in the stack 9.

Premixing of the carbon fuel and oxygen containing gas is not required. The gas can be superheated by the arc heater with the fuel being injected into the superheated gas stream. The carbon fuel can be natural gas, oil, or preferably, finely divided coal with the oxygen-containing gas being air. In addition, the oxygen-containing gas usually contains some moisture which is present in the gases in the furnace in the form of water vapor, typically superheated steam. This water vapor and excess arc heated gas, termed off-gases exit the top of the furnace and enter the gas uptake 27 from where it is conveyed to the gas scrubber 35.

In the gas scrubber 35 these off-gases are cleaned of substantially all entrained particulates and water vapor. This cleaning process may be a single-stage process or a two-stage process, the latter having a primary stage to remove coarser particles and a secondary or final stage to remove as much of the remaining particulates as possible. The off-gases then enter a wet cleaner 37 such as a venturi washer. There the gases are washed with water to remove any residual particulates as well as reducing the temperature of the off-gases to about the temperature of the wash water. Any moisture in excess of saturation at this temperature is precipitated thus eliminating the water which was carried over in the off-gases. The temperature of the wash water is typically ambient. The cleaned and cooled off-gases are conveyed to the electrical generating system 41 wherein these cleaned gases are combusted to produce electricity which is transmitted to the power supply 43 for the electric arc heater 50.

Although the blast furnace is disclosed and described as being used for the reduction of iron ore to elemental iron, it is understood that the furnace or similar furnace with some modifications may be used for the reduction of other ores of metals such as copper, lead, tin and zinc or ferroalloys such as ferromanganese.

Figure 2:
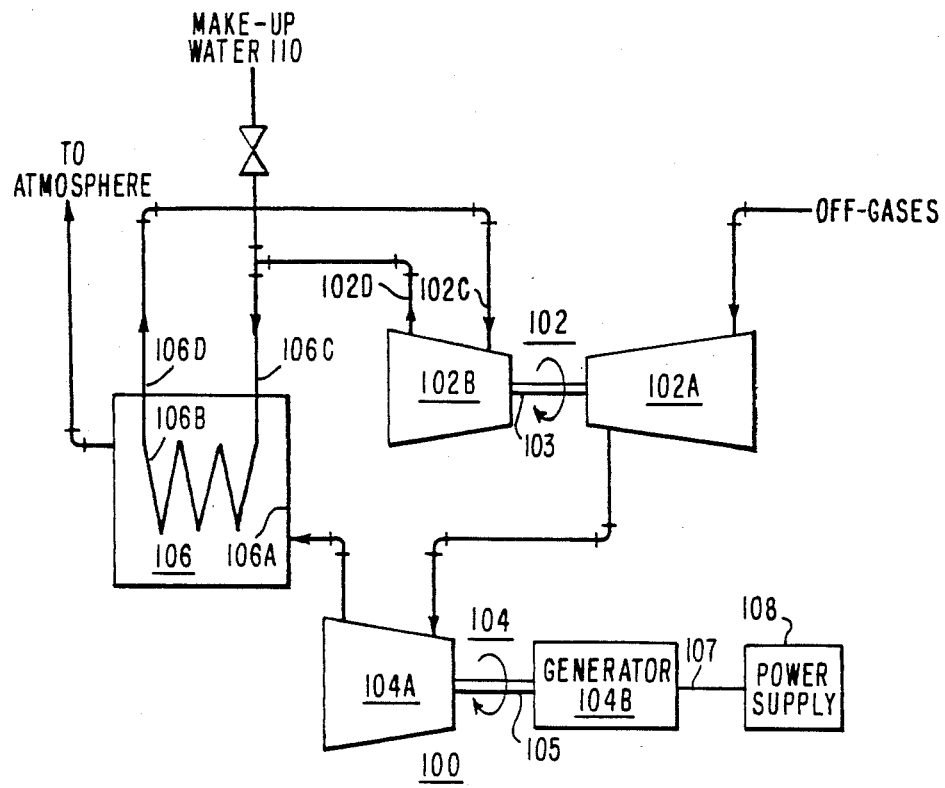
FIG. 2 is a flow diagram for the electrical generating system of the present invention.

As shown in FIG. 2, the electrical generating system generally indicated at 100 consists of a turbine-driven compressor system 102, a combustion turbine-generator set 104 and a heat exchanger 106. The cleaned cooled gases exiting the scrubber enter the gas compressor 102A, are compressed therein and sent to the combustion turbine 104A. The combustion of the gases in the combustion turbine 104A causes the rotation of the output shaft 105 of the turbine which in turn rotates the generator 104B to produce electricity which is transmitted via conductor 107 to the power supply 108 for the arc heater. At times, such as start-up, when the volume of off-gas is insufficient to operate the generator, an alternate source of electrical power (not shown) can be connected to the power supply 108 to operate the arc heater. When off-gas volume is sufficient to operate the generator, this alternate power source is disconnected.

The products of combustion in the combustion turbine 104A are exhausted into the primary side 106A of the heat exchanger 106 for the recovery of the heat energy contained therein. The inlet 106C and outlet 106D of the secondary side 106B of the heat exchanger 106 are connected to the outlet 102D and inlet 102C, respectively, of the steam turbine 102B. A heat exchange medium preferably water is contained in the secondary side 106B and is vaporized by the heat it receives from the gases passing through the primary side 106A of the heat exchanger 106. The products of combustion are exhausted from the primary side 106A and vented to atmosphere. The vaporized medium exits the outlet 106D of the secondary side 106B of the heat exchanger 106 and enters the inlet 102C of the steam turbine 102B causing the rotation of the output shaft 103 thereof which drives the compressor 102A. The vaporized medium condenses in the turbine 102B and is recirculated back into the secondary side 106B of the heat exchanger 106. A supply of make-up water 110 can be provided in the conduit connecting the outlet 102D of the steam turbine 102B and the inlet 106C of the heat exchanger 106 to account for losses in the heat exchanger medium.

Figure 3:
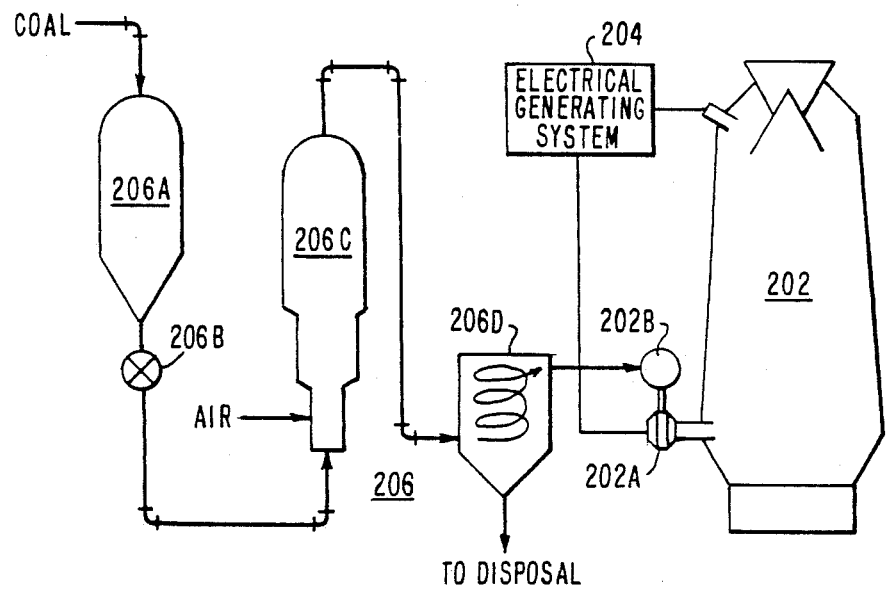
FIG. 3 is a flow diagram of an alternate embodiment of the invention utilizing coal injection.

In FIG. 3 a blast furnace system, generally indicated at 200, utilizing coal injection is shown. The blast furnace system is comprised of a blast furnace 202, an electrical generating system 204 and a coal injection system generally indicated at 206. The blast furnace 202 and electrical generating system are substantially the same as the blast furnace of FIG. 1 and the electrical generating system of FIG. 2, respectively, both of which are described hereinabove.

The coal injection system 206 is used to form a gaseous mixture of finely divided coal and air which is directed into the electric arc heater. A tank 206A is provided for holding a supply of finely divided coal. The coal is discharged from the tank 206A by gravity, or pneumatic or vibratory methods through the valve 206B which is used to control the discharge rate and conveyed to a fluidizing reactor 206C via conventional conveying means such as a pneumatic conveyor. In the fluidizing reactor 206C air is introduced via a gas inlet and is mixed with the coal to form a fluidized mixture which is then exhausted via the outlet of the reactor 206C into a cyclone separator 206D. There the particles of coal, larger than minus 48 mesh, are separated from the coal-air mixture by cyclonic swirling. The remaining mixture is transferred into the arc heater 202A via the bustle pipe 202B for heating to form the reducing gas.

A comparison of existing blast furnaces and the blast furnace system embodying the invention is presented in Table 1. As can be seen a decrease of over 55% in the coke rate can be obtained.

TABLE 1

|  | CONVENTIONAL | ARC HEATED |
| --- | --- | --- |
| Iron Production Rate: | 3380 Tons/Day | 5645 Tons/Day |
| Coke Rate: | 1125 lbs/ton Hot Metal | 500 lbs/ton Hot Metal |
| Coal Rate: | N/A | 1325 Tons/Day |
| Arc Heater Power: | N/A | 94,000 Kilowatts |

To determine the amount of electric power required a figure of 400 kilowatt-hours per ton of hot metal was used. In addition the coal which is used can be of any type thus reducing the need for high quality metallurgical coking coal.

The various embodiments exemplary of the invention present an essentially closed loop blast furnace system providing the dual advantage of a reduction in the coke rate necessary to produce iron by the injection of arc-heated reducing gases while simultaneously eliminating the necessity of purchasing utility generated power during normal operations by producing the electricity for the arc heater from the combustion of the off-gases exhausted from the furnace.

I claim:

1. A blast furnace system for reducing metal ore contained in a burden to a metal, comprising:

blast furnace means having a refractory shell defining a vertical shaft, the upper, middle and lower regions thereof being the stack, bosh and hearth, respectively, the shaft containing the burden and products of reaction;

a tuyere having a nose end and a tail end, the nose end extending through the refractory shell and being in communication with the bosh;

means for injecting a gaseous mixture of pulverized carbon-containing fuel and an oxygen-containing gas into the bosh and comprising at least one electric arc heater;

the electric arc heater having an electrode and an arcing chamber, the electrode connected to a source of electricity to produce an electric arc in the arcing chamber;

inlet means communicating with the arcing chamber for introducing the gaseous mixture into the arcing chamber to form an arc-heated gas stream containing a reducing gas;

outlet means intermediate the arcing chamber and the tail end of the tuyere and communicating therebetween such that the arc-heated gas stream can pass therethrough for injection into the bosh to contact the burden, the arc-heated gas stream reacting with the burden, the products of reaction including metal, slag and water vapor, the metal and slag being collected in the hearth, the arc-heated gas stream passing upwardly through the burden entraining particulates and water vapor and causing the prereduction and preheating of the burden in the stack;

gas uptake means for receiving the excess arc-heated gas stream and water vapor exhausted from the top of the shaft, the upstream end of the gas uptake means communicating with the top of the shaft;

gas scrubber means communicating with the downstream end of the gas uptake means for cleaning the gases exhausted from the blast furnace means of substantially all entrained particulates and water vapor;

a gas compressor, the inlet being in communication with the outlet of the gas scrubber means, the gas compressor compressing the cleaned gases exiting the gas scrubber means;

a combustion turbine, the inlet being in communication with the outlet of the gas compressor, the compressed gases being combusted therein to rotate the output shaft of the turbine;

an electric generator connected to the output shaft of the turbine such that rotation of the turbine output shaft causes the electric generator to produce electricity for use by the electric arc heater;

a heat exchanger having primary and second sides, with the secondary side containing a heat transfer medium, the primary side inlet being in communication with the gas outlet of the combustion turbine, the hot products of combustion passing from the combustion turbine into the primary side wherein they are cooled by the transfer of their heat to the secondary side medium causing the vaporization thereof with the cooled products of combustion being vented out the primary side outlet; and a compressor turbine, the gas inlet and outlet thereof being in communication with the secondary side outlet and inlet, respectively, of the heat exchanger, the vaporized secondary side medium entering therethrough to cause the rotation of the output shaft of the turbine while condensing therein, the cooled secondary side medium being recirculated into the heat exchanger with the output shaft of the compressor turbine being connected to and driving the gas compressor.

2. The blast furnace system of claim 1 wherein the oxygen-containing gas is air.

3. The blast furnace system of claim 2 wherein the metal ore is iron ore.

4. The blast furnace system of claim 3 wherein the arc-heated gas stream has a temperature in the range of about 2000° C. to about 2500° C.

5. The blast furnace system as described in claim 1 wherein the means for injecting the gaseous mixture further comprises:

a tank for holding finely divided coal;

a fluidizing reactor wherein finely divided coal is mixed with an oxygen-containing gas to form the gaseous mixture;

conveying means communicating with the tank and the reactor for carrying the finely divided coal from the tank into the reactor;

gas inlet means communicating with the fluidizing reactor for introducing an oxygen-containing gas therein; and reactor outlet means communicating with the inlet means of the electric arc heater for transferring the gaseous mixture into the electric arc heater.

6. The blast furnace system of claim 5 wherein the oxygen-containing gas is air.

7. The blast furnace system of claim 6 wherein the metal ore is iron ore.

8. The blast furnace system of claim 7 wherein the arc-heated gas stream has a temperature in the range of about 2000° C. to about 2500° C.

* * * * *